United States Patent
Chang et al.

(10) Patent No.: US 8,773,610 B2
(45) Date of Patent: Jul. 8, 2014

(54) LIQUID CRYSTAL DISPLAY AND FRAME SET WITH EASY FIXING STRUCTURE THEREOF

(75) Inventors: Chia-Hsin Chang, Hsin-Chu (TW); Lin-Wei Chiu, Hsin-Chu (TW); Po-Chun Hsu, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 279 days.

(21) Appl. No.: 12/371,732

(22) Filed: Feb. 16, 2009

(65) Prior Publication Data
US 2009/0296016 A1 Dec. 3, 2009

(30) Foreign Application Priority Data
May 29, 2008 (TW) .............................. 97119889 A

(51) Int. Cl.
*G02F 1/1333* (2006.01)
(52) U.S. Cl.
USPC .............................................. 349/59; 349/58
(58) Field of Classification Search
USPC ............................................... 349/52, 58–59
See application file for complete search history.

(56) References Cited

U.S. PATENT DOCUMENTS

| 7,295,260 B2 | 11/2007 | Harayama et al. | |
|---|---|---|---|
| 2003/0234894 A1* | 12/2003 | Lee | 349/58 |
| 2005/0006548 A1* | 1/2005 | Goh et al. | 248/317 |
| 2006/0146223 A1* | 7/2006 | Iwai et al. | 349/58 |
| 2008/0259239 A1 | 10/2008 | Fang | |

FOREIGN PATENT DOCUMENTS

| CN | 101149495 | | 3/2008 | |
| CN | 201041605 | | 3/2008 | |
| TW | M242728 | | 9/2004 | |
| TW | M-298136 | * | 9/2006 | ............. G20F 1/133 |
| TW | M298136 | | 9/2006 | |

OTHER PUBLICATIONS

Exhibit 1: a photograph of a CD & DVD Box & its short description.
English language translation of abstract and pertinent parts of CN 101149495 (published Mar. 26, 2008).
English language translation of abstract of CN 201041605 (published Mar. 26, 2008).
English translation of abstract and pertinent parts of TW M298136.
English translation of abstract of TW M242728.

* cited by examiner

*Primary Examiner* — Lauren Nguyen
(74) *Attorney, Agent, or Firm* — McClure, Qualey & Rodack, LLP

(57) ABSTRACT

The present invention discloses a liquid crystal display that includes a plastic frame, a printed circuit board, a pin, a slot, a first constraining part and a liquid crystal panel. The printed circuit board has at least one hole therein. The pin is disposed on the plastic frame. The slot is formed on the pin and extends along the major axis of the pin. The first constraining part is disposed on the side surface of the pin for constraining the printed circuit board between the first constraining part and the plastic frame. The liquid crystal panel is held by the plastic frame and electrically connected to the printed circuit board.

18 Claims, 3 Drawing Sheets

US 8,773,610 B2

LIQUID CRYSTAL DISPLAY AND FRAME SET WITH EASY FIXING STRUCTURE THEREOF

RELATED APPLICATIONS

This application claims priority to Taiwan Application Serial Number 97119889, filed May 29, 2008, which is herein incorporated by reference.

BACKGROUND

1. Field of Invention

The present invention relates to a liquid crystal display. More particularly, the present invention relates to a frame set of a liquid crystal display.

2. Description of Related Art

With the progress in technology and the development in media, users require a high quality in seeing and hearing equipment. Liquid crystal displays (LCD) have many advantages over conventional types of displays, such as cathode ray tube (CRT), including having high display quality, having small volume, being lightweight, and having low driving voltage and low power consumption. Hence, LCDs are widely used in small portable televisions, mobile telephones, video recording units, notebook computers, desktop monitors, projector televisions and so on, and they have gradually replaced the conventional CRT as a mainstream display unit.

LCD TV is the main application for LCD. In LCD TV, a drive printed circuit board (PCB) is fixed in the side of the plastic frame. For reaching such structure, a wall has to be formed in the plastic frame. An additional screw is used to fix the drive printed circuit board and provides grounding function by a fabricator. However, such structure is complicated and is not fit to process a reworking process when a failure happens. Therefore, an easy structure to fix the drive PCB in plastic frame is needed.

SUMMARY

An aspect of the present invention is related to an LCD that uses a pin to fix the printed circuit board in the plastic frame.

The present invention discloses a liquid crystal display that includes a plastic frame, a printed circuit board, a pin, a slot, a first constraining part and a liquid crystal panel. The printed circuit board has at least one hole therein. The pin is disposed on the plastic frame. The slot is formed on the pin and extends along the major axis of the pin. The first constraining part is disposed on the side surface of the pin for constraining the printed circuit board between the first constraining part and the plastic frame. The liquid crystal panel is held by the plastic frame and electrically connected to the printed circuit board.

Another aspect of the present invention is related to a frame set to cooperate with the above liquid crystal display.

The frame set of the present invention includes plastic frame, a printed circuit board, a pin, a slot, a first constraining part. The printed circuit board has at least one hole therein. The pin is disposed on the plastic frame. The slot is formed on the pin and extends along the major axis of the pin. The first constraining part is disposed on the side surface of the pin for constraining the printed circuit board between the first constraining part and the plastic frame.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
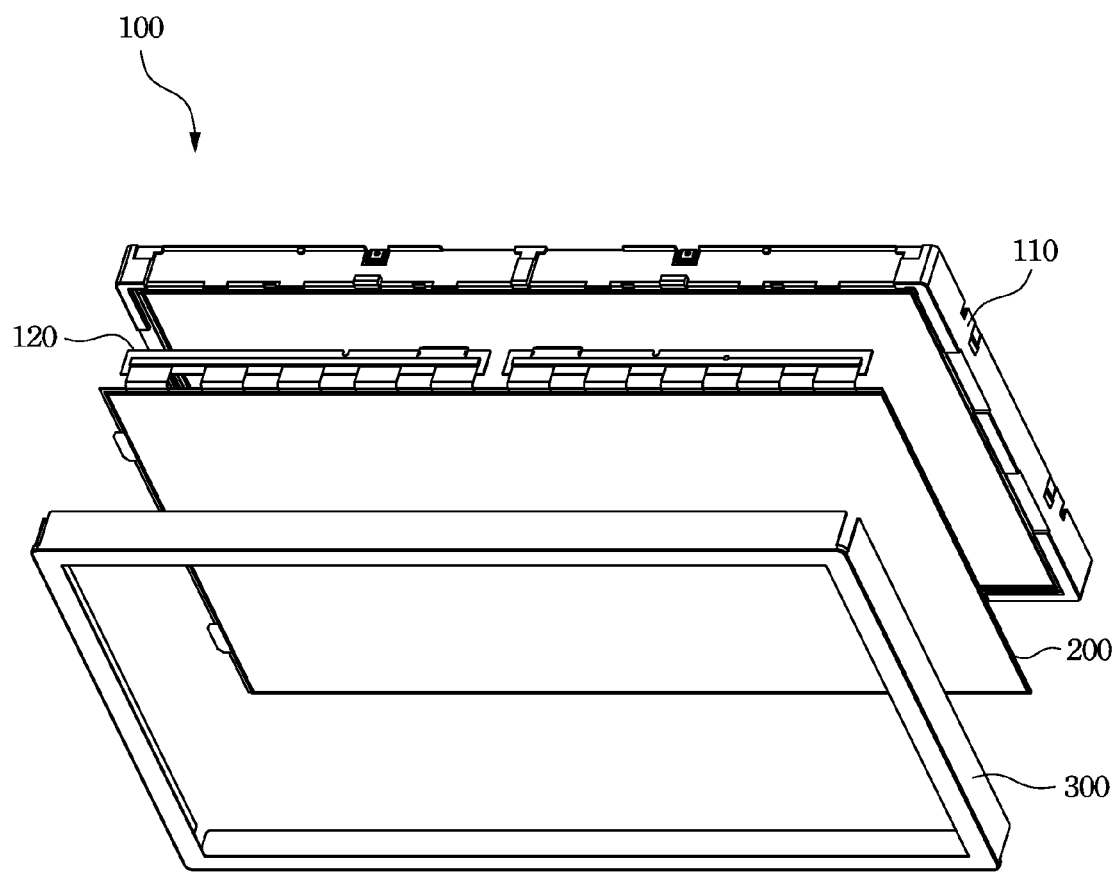
FIG. 1 shows an exploded diagram of a liquid crystal display according to the present invention.

FIG. 1 shows an exploded diagram of a liquid crystal display according to the present invention. The liquid crystal display 100 includes a plastic frame 110, a printed circuit board 120, a liquid crystal panel 200 and a front frame 300. The liquid crystal panel 200 is located in the plastic frame 110 and connected to the printed circuit board 120. The printed circuit board 120 is fixed in the side of the plastic frame 110. Front frame 300 circumscribes the plastic frame 110, the printed circuit board 120 and the liquid crystal panel 200 to constitute a liquid crystal display 100.

Figure 2:
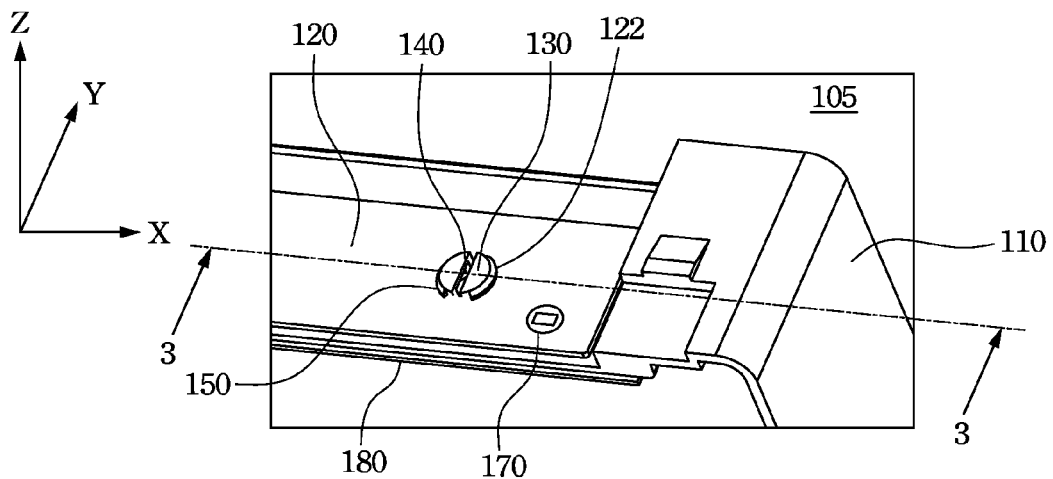
FIG. 2 shows an enlarged diagram of a printed circuit board when the liquid crystal display in FIG. 1 is constituted.
Figure 3:
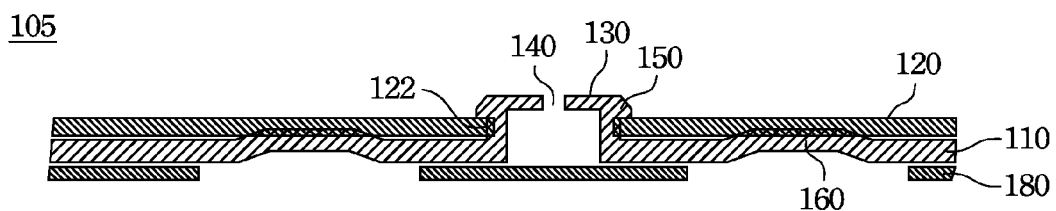
FIG. 3 illustrates a side cross-sectional view along the line 3 in FIG. 2.

FIG. 2 shows an enlarged diagram of a printed circuit board 120 when the liquid crystal display 100 is constituted. FIG. 3 illustrates a side cross-sectional view along the line 3 in FIG. 2. The liquid crystal display 100 includes a pin 130, a slot 140 and a first constraining part 150 to fix the printed circuit board 120 in the side of the plastic frame 110. The pin 130 is disposed on the plastic frame 110. The slot 140 is formed on the pin 130 and extends along the major axis of the pin 130. The first constraining part 150 is disposed on the side surface of the pin 130.

The printed circuit board 120 board has at least one hole 122 therein. When in use, the hole 122 is aligned to the pin 130. Then, the printed circuit board 120 is pressed to constrain the first constraining part 150 disposed on the side surface of the pin 130. The first constraining part 150 can pass through the hole 122 by pushing the pin 130 toward the slot 140. After the first constraining part 150 passes through the hole 122, the pin 130 returns the original position to make the first constraining part 150 be against the surface opposite to the plastic frame 110 of the printed circuit board 120.

Because the pin 130 has been inserted into the hole 122 of the printed Circuit board 120, the pin 130 can limit the moving of the printed circuit board 120 in the X direction and Y direction. On the other hand, because the first constraining part 150 is against the surface opposite to the plastic frame 110 of the printed circuit board 120, the moving of the printed circuit board in the Z direction is also limited. That is that the printed circuit board 120 is constrained between the first constraining part 150 and the plastic frame 110. Accordingly, the printed circuit board 120 is fixed in the plastic frame 110 by the pin 130 and the first constraining part 150. Therefore, such fixing structure can replace the conventional method of using a screw to tight the printed circuit board.

Moreover, a frame set 105 is disclosed in the FIG. 1 and FIG. 2. The frame set 105 includes a plastic frame 110, a printed circuit board 120, a pin 130, a slot 140, and a first constraining part 150. The printed circuit board 120 has at least one hole 122 therein. The pin 130 is disposed on the plastic frame 110. The slot 140 is formed on the pin 130 and extends along the major axis of the pin 130. The first constraining part 150 is disposed on the side surface of the pin 130 for constraining the printed circuit board 120 between the first constraining part 150 and the plastic frame 110.

The material of the pin 130 is a flexible material to help a user to easily dispose the printed circuit board 120. In an embodiment, the material of the pin 130 is polycarbonate. However, in another embodiment, different material pin 130 can also be used to realize the present invention.

Two structures described in the following are used to improve the flexible strength of the pin 130. One is to use a hollow structure to form the pin 130. The other is to extend the slot 140 to a part of the plastic frame 110 indicated by arrow P illustrated in FIG. 4. A person skilled in the art can use one of the two structures or both structures to fix the printed circuit board 120 in a liquid crystal display based on his requirement.

Figure 4:
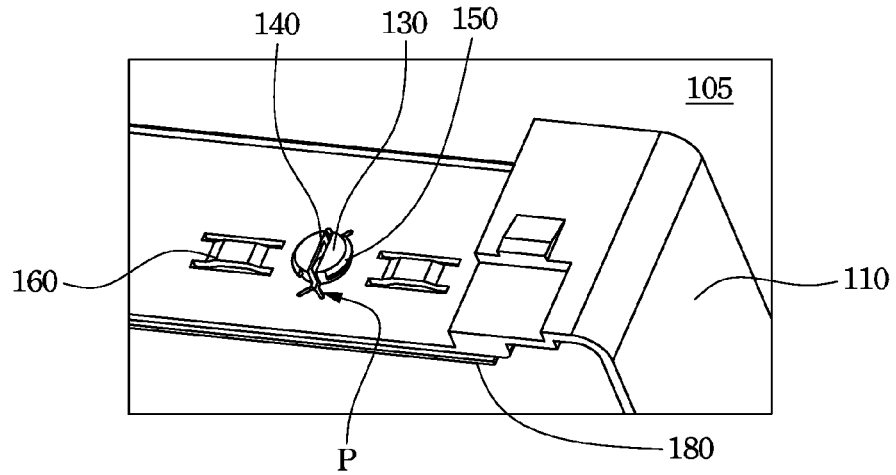
FIG. 4 shows a three-dimension of FIG. 2, wherein the printed circuit is not illustrated therein.

Referring to FIG. 1 and FIG. 4, the liquid crystal display further includes a second constraining part 160 located in the plastic frame 110 to be against the printed circuit board 120. The second constraining part 160 is designed to prevent the printed circuit board 120 from being shaken in the Z direction. The vertical distance between the first constraining part 150 and the second constraining part 160 is less than the thickness of the printed circuit board 120. Therefore, when the printed circuit board 120 is disposed, the second constraining part 160 is deformed. For example, the thickness of the printed circuit board is 0.8 mm, the vertical distance between the first constraining part 150 and the second constraining part 160 is 0.6 mm.

The pin 130 and the hole 122 are designed to prevent the printed circuit board 120 from being shaken in the X direction and Y direction. The size, such as the diameter, of the pin 130 is larger than the size, such as the diameter, of the hole 122. Therefore, when the printed circuit board 120 is disposed, the pin 130 is deformed.

When the printed circuit board is dismantled, the pin 130 is pressed toward the slot 140 to make the first constraining part 150 leave the hole 122. At this time, the second constraining part 160 automatically returns to the original position to push the printed circuit board 120 out the pin 130. No additional operation is required to out the printed circuit board 120.

Accordingly, in this embodiment, the pin 130, the first constraining part 150 and the second constraining part 160 are used to fix the printed circuit board. Such structure does not require additional work to turn a screw to tighten the printed circuit board 120. Therefore, the producing efficiency is improved.

In this embodiment, the plastic frame 110, the pin 130, the first constraining part 150 and the second constraining part 160 are formed by a mold, such as an injection molding method. The material of the plastic frame 110, the pin 130, the first constraining part 150 and the second constraining part 160 are polycarbonate. However, in another embodiment, different material can also be used to realize the plastic frame 110, the pin 130, the first constraining part 150 and the second constraining part 160.

In FIG. 1 and FIG. 2, the liquid display includes a grounding screw 170 located in the grounding position in the printed circuit board 120 to provide a grounding potential. The grounding screw 170 is an operational device. A person skilled in the art can select another device to provide the grounding potential. For example, a metal back plate in the plastic frame can be used to provide the grounding potential. Such structure can remove the necessity of the grounding screw 170. The following embodiment describes the above technology.

Figure 5:
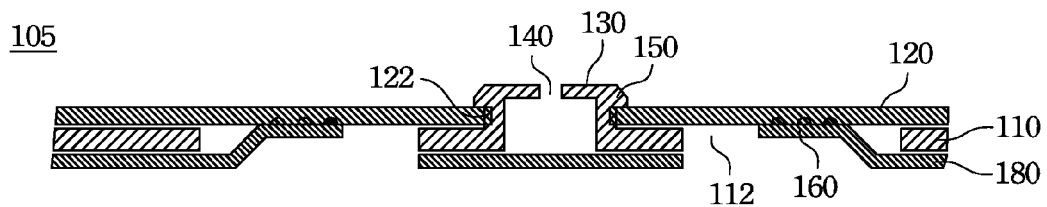
FIG. 5 shows a side cross-sectional view according to another embodiment of the present invention.
Figure 6:
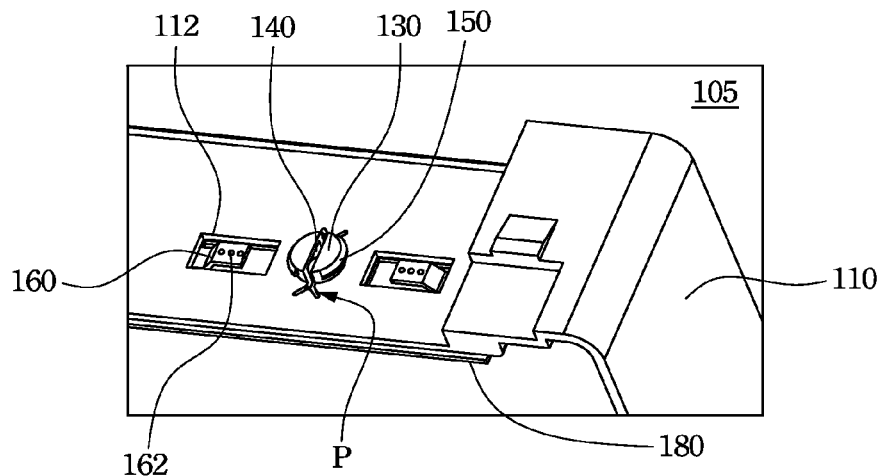
FIG. 6 shows a three-dimension of FIG. 5, wherein the printed circuit is not illustrated therein.

FIG. 5 shows a side cross-sectional view according to another embodiment of the present invention. The direction to view the cross section is same as FIG. 3. FIG. 6 shows a three-dimension of FIG. 5, wherein the printed circuit is not illustrated therein. A hole 112 passes through the plastic frame 110 to expose the metal back plate 180 of the plastic frame 110. The second constraining part 160 is disposed on the metal back plate 180 and passes through the hole 112 to be against the grounding position of the printed circuit board 120 to provide the grounding potential.

In this embodiment, the second constraining part 160 and the metal back plate 180 are formed by a mold. The material of the second constraining part 160 and the metal back plate 180 are metal to provide the grounding potential. However, in another embodiment, different material also can be used to realize the second constraining part 160 and the metal back plate 180.

Moreover, the second constraining part 160 is deformed after the second constraining part 160 is disposed on the plastic frame. Such deforming can fail the connection between the second constraining part 160 and the printed circuit board 120. Therefore, a plurality of raised point 162 is formed over the second constraining part 160 to connect with the grounding position of the printed circuit board 120 to prevent the connection failure because of the deforming of the second constraining part 160 between the second constraining part 160 and the printed circuit board 120.

Figure 7:
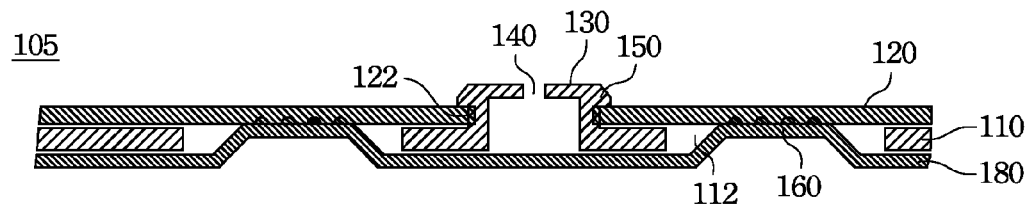
FIG. 7 shows a side cross-sectional view according to another embodiment of the present invention.
Figure 8:
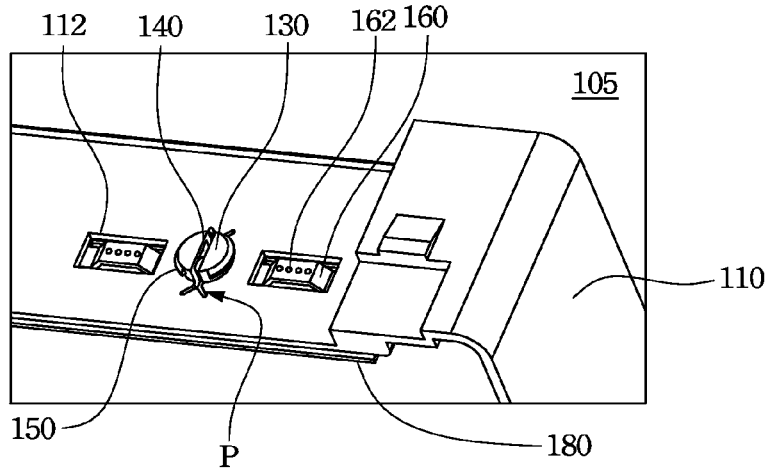
FIG. 8 shows a three-dimension of FIG. 7, wherein the printed circuit is not illustrated therein.

Although the second constraining part 160 is an arm in FIG. 5 and FIG. 6, other structures can be used to realize the second constraining part 160. For example, in another embodiment, the second constraining part 160 is a bridge, which is illustrated in FIG. 7 and FIG. 8.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display, comprising:
   a plastic frame;
   at least one printed circuit board having a first surface, a second surface, and at least one first hole penetrating through the printed circuit board, and an end of the first hole being located at the first surface and another end of the first hole being located at the second surface, wherein the first surface and the second surface are two opposite surfaces of the printed circuit board;
   at least one pin disposed on the plastic frame;
   at least one slot formed on the pin;
   at least one first constraining part disposed on the side surface of the pin for constraining the printed circuit board between the first constraining part and the plastic frame, wherein the first constraining part is configured to be against the first surface of the printed circuit board;
   at least one second constraining part against second surface of the printed circuit board at least one second hole passing through the plastic frame; and a metal back plate disposed inside the plastic frame; wherein the printed circuit board is disposed outside the plastic frame, the second constraining part is disposed on the metal back plate and passing through the second hole to be against a grounding position of the printed circuit board, and the material of the second constraining part is metal; and a liquid crystal panel held by the plastic frame and electrically connected to the printed circuit board.

2. The liquid crystal display of claim 1, wherein the material of the pin is a flexible material.

3. The liquid crystal display of claim 1, wherein the pin has a hollow structure.

4. The liquid crystal display of claim 1, wherein the second constraining part is disposed on the plastic frame.

5. The liquid crystal display of claim 1, further comprising a screw disposed at a grounding position of the printed circuit board.

6. The liquid crystal display of claim 1, wherein the second constraining part has a plurality of raised point to connect with the grounding position of the printed circuit board.

7. The liquid crystal display of claim 1, wherein the second constraining part is an arm.

8. The liquid crystal display of claim 1, wherein the second constraining part is a bridge.

9. A frame set, comprising:

a plastic frame;

at least one printed circuit board having a first surface, a second surface, and at least one first hole penetrating through the printed circuit board, and an end of the first hole being located at the first surface and another end of the first hole being located at the second surface, wherein the first surface and the second surface are two opposite surfaces of the printed circuit board;

at least one pin disposed on the plastic frame;

at least one slot formed on the pin;

at least one first constraining part disposed on the side surface of the pin for constraining the printed circuit board between the first constraining part and the plastic frame, wherein the first constraining part is configured to be against the first surface of the printed circuit board; and at least one second constraining part against the second surface of the printed circuit board at least one second hole passing through the plastic frame; and a metal back plate disposed inside the plastic frame; wherein the printed circuit board is disposed outside the plastic frame, the second constraining part is disposed on the metal back plate and passing through the second hole to be against a grounding position of the printed circuit board, and the material of the second constraining part is metal.

10. The frame set of claim 9, wherein the material of the pin is a flexible material.

11. The frame set of claim 9, wherein the pin has a hollow structure.

12. The frame set of claim 9, wherein the second constraining part is disposed on the plastic frame.

13. The frame set of claim 9, further comprising a screw disposed at a grounding position of the printed circuit board.

14. The frame set of claim 9, wherein the second constraining part has a plurality of raised point to connect with the grounding position of the printed circuit board.

15. The frame set of claim 9, wherein the second constraining part is an arm.

16. The frame set of claim 9, wherein the second constraining part is a bridge.

17. The liquid crystal display of claim 1, wherein the slot is formed on the first constraining part.

18. The frame set of claim 9, wherein the slot is formed on the first constraining part.

* * * * *